Jan. 7, 1930.   C. C. FARMER   1,742,381
TRAIN CONTROL DEVICE
Filed Nov. 24, 1928

INVENTOR
CLYDE C. FARMER
BY *Wm. M. Cady*
ATTORNEY

Patented Jan. 7, 1930

1,742,381

UNITED STATES PATENT OFFICE

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA

TRAIN-CONTROL DEVICE

Application filed November 24, 1928. Serial No. 321,544.

This invention relates to valve devices, and more particularly to a manually operable valve device for use in connection with automatic train control equipments.

With some types of automatic train control equipments, an acknowledging valve device is employed, which is adapted to be manually operated by the engineer for supplying fluid under pressure to a mechanism, by the operation of which, the train control apparatus is prevented from operating.

With the acknowledging valve device heretofore employed, if the operator presses down on the operating handle of the acknowledging valve device, the valve will be held off its seat and thereby the acknowledging action will be effective when not desired.

The principal object of my invention is to provide a valve device in which pressure applied to the operating handle will not move the valve from its seat.

Figure 1:
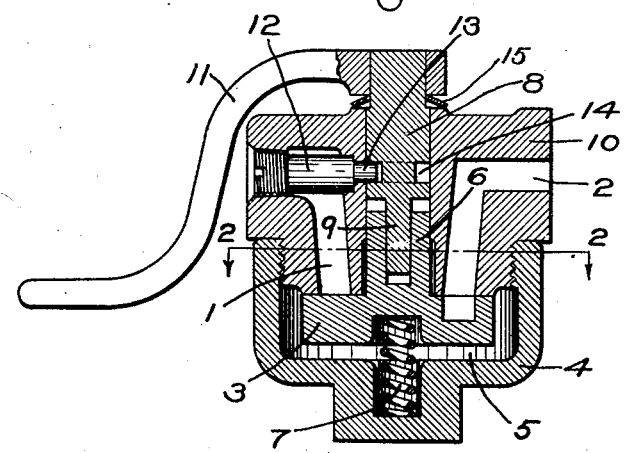
Figure 2:
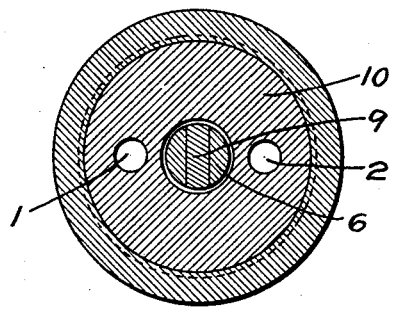

In the accompanying drawing; Fig. 1 is a central sectional view of a valve device embodying my invention; and Fig. 2 a section on the line 2—2 of Fig. 1.

As shown in the drawing, the valve device may comprise a casing 10 having fluid pressure inlet and outlet passages 1 and 2 and provided with a valve seat for a rotary valve 3, adapted to control said passages.

A cap 4 has screw-threaded engagement with the casing 1 and forms a valve chamber 5 in which the valve 3 is contained. The valve 3 is provided with a central stem 6 which extends into a central bore of the casing 1 and the valve is urged to its seat by a spring 7 which is held in place by the cap 4.

Extending into the bore containing the stem 6 but from the opposite direction is a key stem 8, having its lower portion machined to form a tongue 9 adapted to slide vertically in a corresponding groove or slot which is cut in the upper portion of the stem 6.

Secured to the outer end of the key 8 is an operating handle 11. In order to prevent removal of the key 8, a set screw 12 is provided, having screw-threaded engagement in the casing 10 and having a reduced portion 13 adapted to engage in an annular groove 14 cut in the key 8. The portion 13 may be a loose fit in the groove 14, and in order to prevent jiggling of the key, a spring washer 15 may be interposed between the casing 10 and the handle.

Lost motion is provided vertically between the stem 6 and the key 8, so that pressure applied to the key will not move the stem 6 and consequently the valve 3 from its seat, while at the same time, the tongue and groove connection between the stem 6 and the key 8 provides for the rotation of the stem 6 when the key 8 is rotated by operation of the handle 11, the valve 3 being held to its seat by the action of the spring 7.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. A manually operated valve device comprising a casing having a bore, a rotary valve having a stem extending into said bore, a key member having a tongue extending into a groove in said stem, and a handle for operating said key.

2. A manually operated valve device comprising a casing having a bore, a rotary valve having a stem extending into said bore, a key mounted in said bore and having a tongue slidably engaging a groove in said stem to permit relative axial movement between the key and the stem, and a handle secured to said key for rotating said stem and valve.

3. A manually operated valve device comprising a casing having a bore, a rotary valve having a stem extending into said bore, a key movable axially relatively to said stem and operatively connected to rotate said stem, and a handle for rotating said key.

4. A manually operated valve device comprising a casing having a bore, a rotary valve having a stem extending into said bore, a key movable axially relatively to said stem and operatively connected to rotate said stem, and a member mounted in said casing, and engaging an annular groove in said key.

5. A manually operated valve device comprising a casing having a bore, a rotary valve having a stem extending into said bore, a key movable axially relatively to said stem and operatively connected to rotate said stem, and a member having screw-threaded engagement in said casing and having a portion engaging in a groove in said key for preventing removal of the key while permitting rotation thereof.

6. A manually operated valve device comprising a casing having a bore, a rotary valve having a stem extending into said bore, a key movable axially relatively to said stem and operatively connected to rotate said stem, a pin engaging in an annular groove in said key to prevent longitudinal movement of the key while permitting rotative movement thereof, and a spring urging said key into longitudinal engagement with said pin.

7. A manually operated valve device comprising a casing having a bore, a rotary valve having a stem extending into said bore, and having a seat on said casing, a spring urging said valve to its seat, a key operatively connected to said stem for rotating same and movable axially relatively to the stem, a pin engaging an annular groove in said key for limiting axial movement of the key, a spring washer urging the key axially and a handle for rotating said key.

In testimony whereof I have hereunto set my hand, this 22nd day of November, 1928.

CLYDE C. FARMER.